United States Patent [19]

Inagaki

[11] Patent Number: 5,577,107
[45] Date of Patent: Nov. 19, 1996

[54] COMMUNICATION TERMINAL APPARATUS FOR DISPLAYING WHETHER ANY OF A PLURALITY OF OTHER COMMUNICATION TERMINAL APPARATUSES IS RECEIVING AN IMAGE

[75] Inventor: Atsushi Inagaki, Yokohama, Japan

[73] Assignee: Canon Kabushiki Kaisha, Tokyo, Japan

[21] Appl. No.: 281,158

[22] Filed: Jul. 27, 1994

[30] Foreign Application Priority Data

Jul. 29, 1993 [JP] Japan .................................... 5-188294

[51] Int. Cl.$^6$ ....................................................... H04M 11/00
[52] U.S. Cl. ............................... 379/96; 379/202; 348/15
[58] Field of Search ......................... 348/14–16; 379/201, 379/202, 93, 96–98, 100

[56] References Cited

U.S. PATENT DOCUMENTS

| | | | |
|---|---|---|---|
| 4,560,833 | 12/1985 | Weber et al. | 348/14 |
| 4,893,333 | 1/1990 | Baran et al. | 379/100 |
| 4,974,254 | 11/1990 | Perine et al. | 379/100 |
| 5,068,888 | 11/1991 | Scherk et al. | 379/100 |
| 5,418,560 | 5/1995 | Yasuda | 379/96 |
| 5,446,491 | 8/1995 | Shibata et al. | 348/15 |

FOREIGN PATENT DOCUMENTS

0410378  1/1991  European Pat. Off. ................. 348/15

*Primary Examiner*—Wing F. Chan
*Attorney, Agent, or Firm*—Fitzpatrick, Cella, Harper & Scinto

[57] ABSTRACT

When it is desired to display an image of another station during a multi-station visual conference, an image request signal is output. A multi-station visual conference communication control device transmits an image of the requested station to the station which requested the image, and transmits the image request signal to the requested station. Upon receipt of the image request signal, a system control circuit causes a synthesis circuit to generate a screen frame signal and stores identifying information regarding the station which has made the request. As a result, a frame is displayed in the periphery of a monitor screen so that the user can know through observation of the frame that the user's own image is displayed at another station. An image request release signal may also be received at a station, in response to which the system control circuit erases the storage of the image request, and causes the synthesis circuit to erase the screen frame signal when there is no other station which requests an image.

40 Claims, 9 Drawing Sheets

COMMUNICATION TERMINAL APPARATUS FOR DISPLAYING WHETHER ANY OF A PLURALITY OF OTHER COMMUNICATION TERMINAL APPARATUSES IS RECEIVING AN IMAGE

BACKGROUND OF THE INVENTION

1. Field of the Invention

The present invention relates to a communication terminal apparatus for receiving and transmitting communication data including at least image data between a plurality of terminals.

2. Description of the Related Art

In a conventional communication terminal apparatus for a video conference system, a plurality of terminals are connected to each other through communication lines so as to receive and transmit images and speech for communication between many points.

When such a conventional communication system is utilized for two-point communication, it is obvious that an image of a terminal is displayed on only one other terminal screen. However, in the case of communication between three or more points, there is no means for confirming whether an input image of the user's terminal is displayed on another terminal screen, and, if it is which terminal screen the image is displayed on. Thus, for example, the attendees at a conference linked by such a system must always be conscious of a camera.

SUMMARY OF THE INVENTION

An object of the present invention is to provide a communication terminal apparatus which can sole the above-described problems.

Another object of the present invention is to provide a communication terminal apparatus in which it can be easily judged at the user's own terminal, whether or not a camera input image of the user's own terminal is displayed on another terminal screen.

In order to achieve these objects, in accordance with a preferred embodiment of the present invention, a communication terminal apparatus for communicating communication data including at least image data to a plurality of other communication terminals comprises receiving means for receiving an image request from the other communication terminals, and synthesis means for combining a predetermined image and the image displayed at the user's own terminal in accordance with the image request received by the receiving means.

Still another object of the present invention is to provide a communication terminal apparatus which can confirm the terminal among a plurality of other communication terminals where a camera input image of the user's own terminal is displayed.

A further object of the present invention is to provide a communication terminal apparatus having a novel function.

Other objects and characteristics of the present invention will be made clear from the embodiment below and the drawings.

DESCRIPTION OF PREFERRED EMBODIMENTS

An embodiment of the present invention is described below with reference to the drawings.

Figure 1:
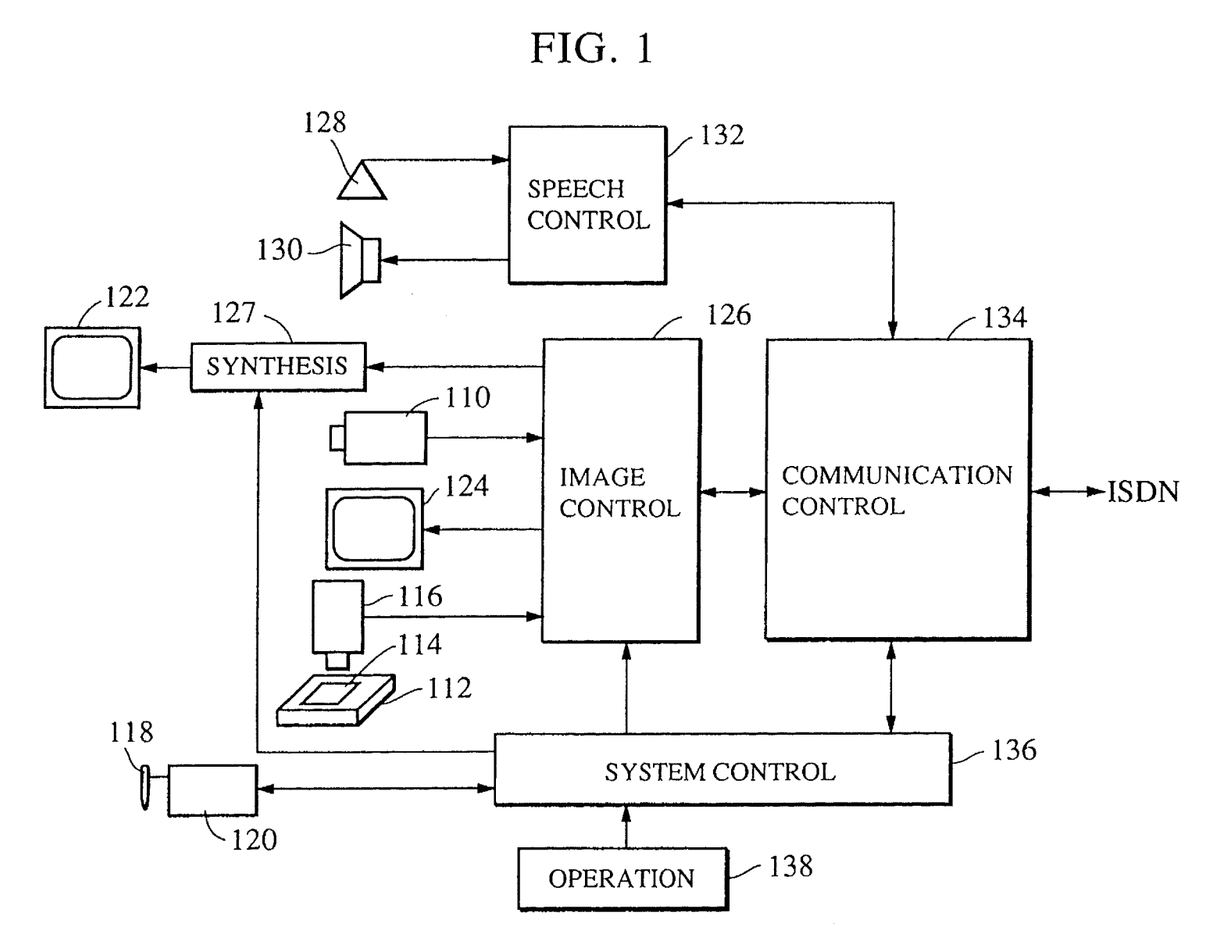
FIG. 1 is a block diagram illustrating the construction of a terminal apparatus in accordance with an embodiment of the present invention.

FIG. 1 is a block diagram illustrating the schematic construction of a communication terminal apparatus in accordance with an embodiment of the present invention. In FIG. 1, reference numeral 110 denotes a camera for photographing the attendees at a conference; reference numeral 116, a picture camera for inputting an image of an original 114 placed on an original base 112; reference numeral 120, a drawing input unit for drawing and inputting; reference numeral 122, a dynamic image display monitor; reference numeral 124, a static image display monitor, reference numeral 126, an image control circuit for controlling selection and synthesis processing of the output image of the camera 110 and the output and received images of the camera 116, image output to the monitors 122 and 124, and coding processing of an image during communication through an ISDN line; and reference numeral 127, a synthesis circuit for adding, with predetermined timing, various patterns (in this embodiment, a frame image) to the image supplied to the monitor 122 from the image control circuit 126.

Reference numeral 128 denotes a microphone; reference numeral 130, a speaker; and reference numeral 132, a speech control circuit for controlling a speech input to the microphone 128 and a speak output to the speaker 130.

Reference numeral 134 denotes a communication control circuit for controlling connection with a communication line, e.g., a ISDN line; and reference numeral 136, a system control circuit for controlling the entire system in accordance with the operation of an operation device 138 and drawing input of the drawing input device 120 and for processing and storing signals in accordance with the image request which will be described below. The system control circuit 136 directs the synthesis circuit 127 to combine a specified pattern with the image signal output from the image control circuit 126 with predetermined timing in accordance with the image request and release of the image request which will be described below. The synthesis method is to combine the frame image, which will be described below, with the predetermined region of VRAMI possessed by the synthesis circuit 127, and then display the synthesized image on the monitor 122.

Figure 3:
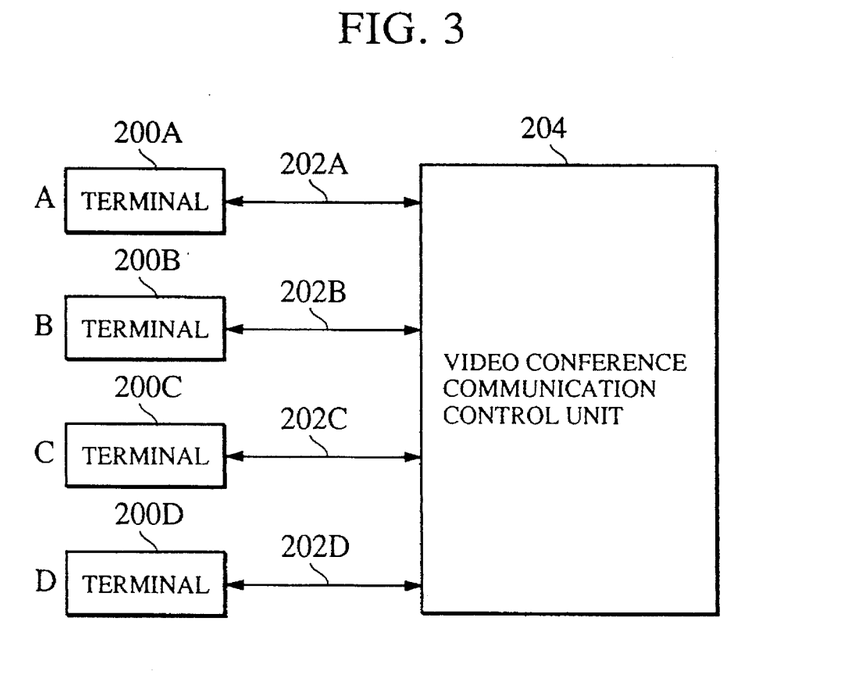
FIG. 3 is a block diagram illustrating the construction of a four-station visual conference.

The operation of this embodiment is described in detail in connection with a four-terminal visual conference as an example. As illustrated in FIG. 3, terminals 200A, 200B, 200C and 200D located at four stations A, B, C and D are connected to a multi-station visual conference communication control device 204 through digital lines 202A, 202B, 202C and 202D, respectively. Each of the terminals 200A, 200B, 200C and 200D has the configuration shown in FIG. 1. The internal circuits of terminals 200A, 200B, 200C and 200D are discriminated from each other by adding characters A, B, C and D to the reference numerals shown in FIG. 1.

The attendees at conferences at stations A, B, C and D are photographed by cameras 110A, 110B, 110C and 110D, respectively. The photographic images are coded by image control circuits 126A, 126B, 126C and 126D, respectively, and transmitted to the multi-station visual conference communication control device 204 through communication control circuits 134A, 134B, 134C and 134D and digital lines 202A, 202B, 202C and 202D, respectively. The multi-station visual conference communication control device 204 transmits, in accordance with an image request signal output from a station, the requested image from among the received images of the conference attendees located at the stations, to the station which requests the image.

When receiving an image of another terminal by means of its communication control circuit 134, a receiving station decodes the received image in its image control circuit 126 and then outputs the decoded image to its synthesis circuit 127. The synthesis circuit 127 applies the image signal received from the image control circuit 126 to the dynamic image display monitor 122 without any processing.

For example, when station D requests a figure image of station A, the system control circuit 136D transmits a request signal for the image of station A to the multi-station visual conference communication control device 204 through the communication control circuit 134D in accordance with instructions from the operation section 138D. The multi-station visual conference communication control device 204 transmits the requested image from station A to station D in accordance with the request signal. Station D receives the image of station A from the multi-station visual conference communication control device 204 through the communication control circuit 134D, decodes the signal in the image control circuit 126D and then displays the figure image of station A on the dynamic image display monitor 122D, as described above.

Figure 2:
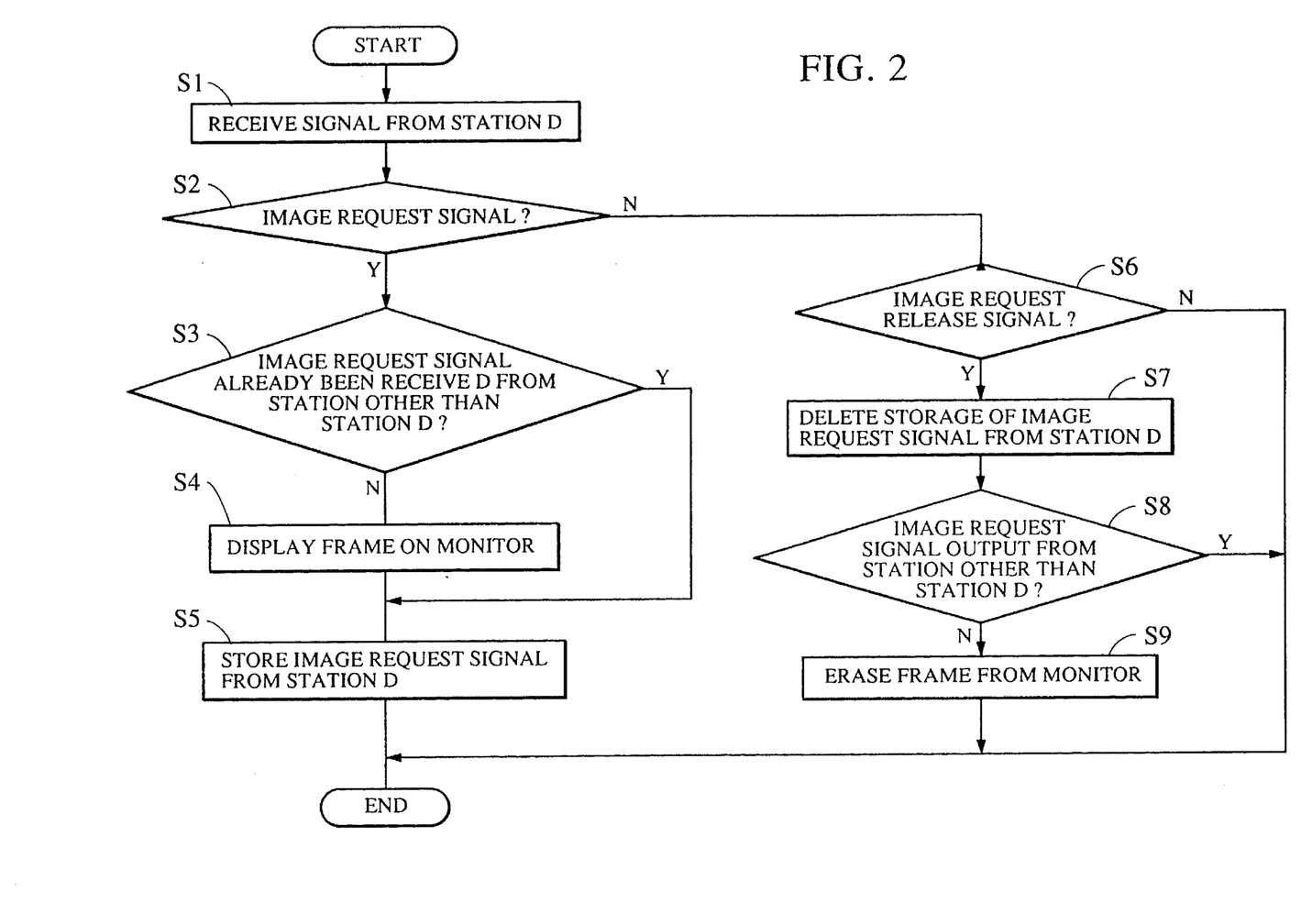
FIG. 2 is a flowchart illustrating the operation at the time of request for an image and release of an image request in the embodiment.

The flowchart of the operation of station A in accordance with an image request from station D and release of the image request is now described with reference to FIG. 2.

Figure 4:
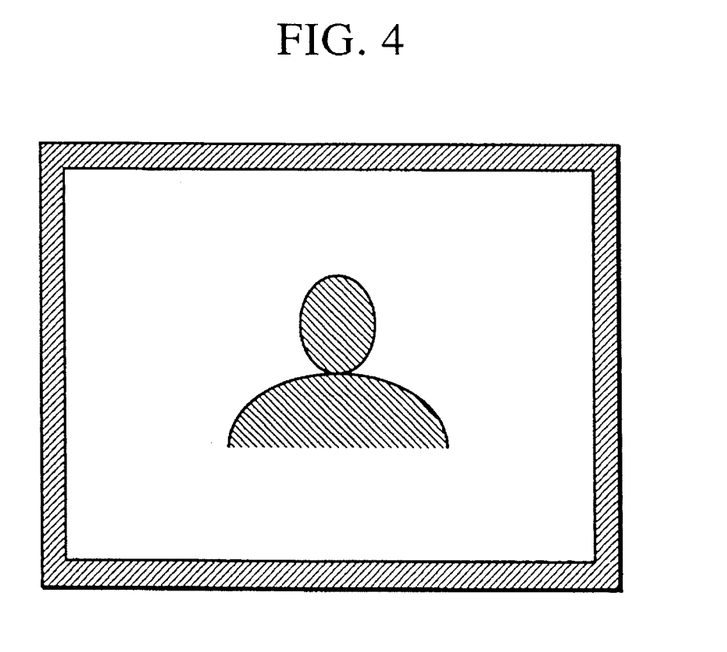
FIG. 4 is a drawing illustrating an example of a display of a dynamic image display monitor.

When station A receives a signal from station D through the multi-station visual conference communication control device 204 (Step S1), the signal from the multi-station visual conference communication control device 204 is applied to the system control circuit 136A through the communication control circuit 134A, and a decision is made at station A as to whether or not the transmitted signal is an image request signal (Step S2). If it is decided that the signal is an image request signal, the system control circuit 136A can know that its own image is displayed on another station. The system control circuit 136A then makes a decision as to whether or not an image request signal has already been received from a station other than station D (Step S3). If no image request signal has been received from a station other than station D, the system control circuit 136A directs the synthesis circuit 127A to combine the frame signal shown in FIG. 4 with the image signal output from the image control circuit 126A. As a result, a frame is displayed in the periphery of the screen of the monitor 122A (Step S4). The user at station A can recognize by the appearance of the frame in the periphery of the screen of the dynamic image display monitor 122A that his own image is displayed at another station. The system control circuit 136A then stores the image request from station D (Step S5). On the other hand, if an image request has already been received from a station other than station D (i.e., B or C) (Step S3), since the frame is displayed in the periphery of the screen of the dynamic image display monitor 122A of station A, Step S4 is skipped, and the image request from station D is stored (Step S5).

When station D transmits a request signal to the multi-station visual conference communication control device 204 for switching the image request for station A to an image request for station B, the multi-station visual conference communication control device 204 transmits the image of station B to station D, and transmits the image request signal, output from station D, to station B to inform station B of the image request, and also transmits an image request release signal to station A. When the system control circuit 136A at station A receives the signal from the multi-station visual conference communication control device 204 (Step S1), a decision is made as to whether or not the received signal is an image request signal. If it is decided that the received signal is not an image request signal (Step S2), a decision is made as to whether or not the signal is an image request release signal, as discussed above. If the received signal is an image request release signal (Step S6), the storage of the image request from station D is deleted (Step S7). The presence of an image request transmitted from another station is then checked. If no image request is received (Step S8), the system control circuit 136A directs the synthesis circuit 127A to erase the frame signal combined with the image transmitted from the image control circuit 126A by the synthesis circuit 127A (step S9).

Figure 5:
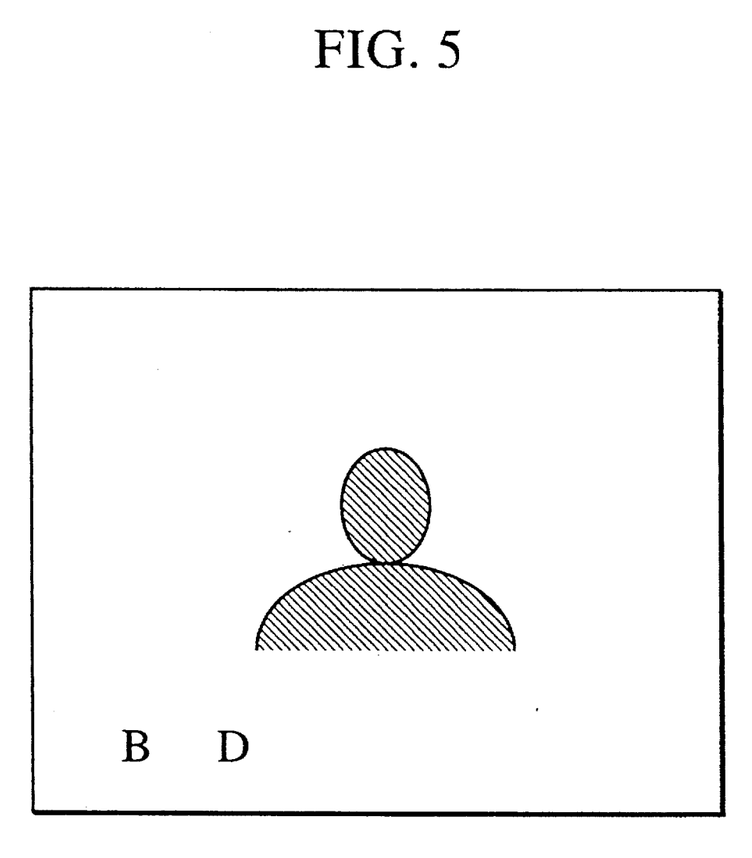
FIG. 5 is a drawing illustrating another example of the display of the dynamic display monitor.

In the above embodiment, the screen frame is displayed and released for ascertaining, at the user's own station, whether or not another station seeks to display the user's image. However, means for displaying the image request is not limited to the screen frame, and a character pattern for indicating another station may be displayed. For example, when image request signals are output from stations B and D, characters B and D for specifying other stations are displayed in a lower portion of the monitor screen, as shown in FIG. 5. If a release signal for the image request output from station D is received from the multi-station visual conference communication control device 204, the system control circuit 136A directs the synthesis circuit 127A to erase the displayed "D". In this way, a pattern for discriminating the presence or absence of an image request may be displayed together with the received image.

A description will now be made of Embodiment 2 in which multi-image display is possible at each of communication terminal stations. For example, it is assumed that image display with a maximum division number of 4 (four images) is possible at each of the communication terminals. In multi-point communication, if the number of other terminal stations is smaller than the maximum division number, an image input from the user's own station is invariably displayed on the monitors at the other stations. However, in multi-point communication between a predetermined number or more of other stations, the input image of the user's own station is not necessarily displayed at the other stations.

Figure 6:
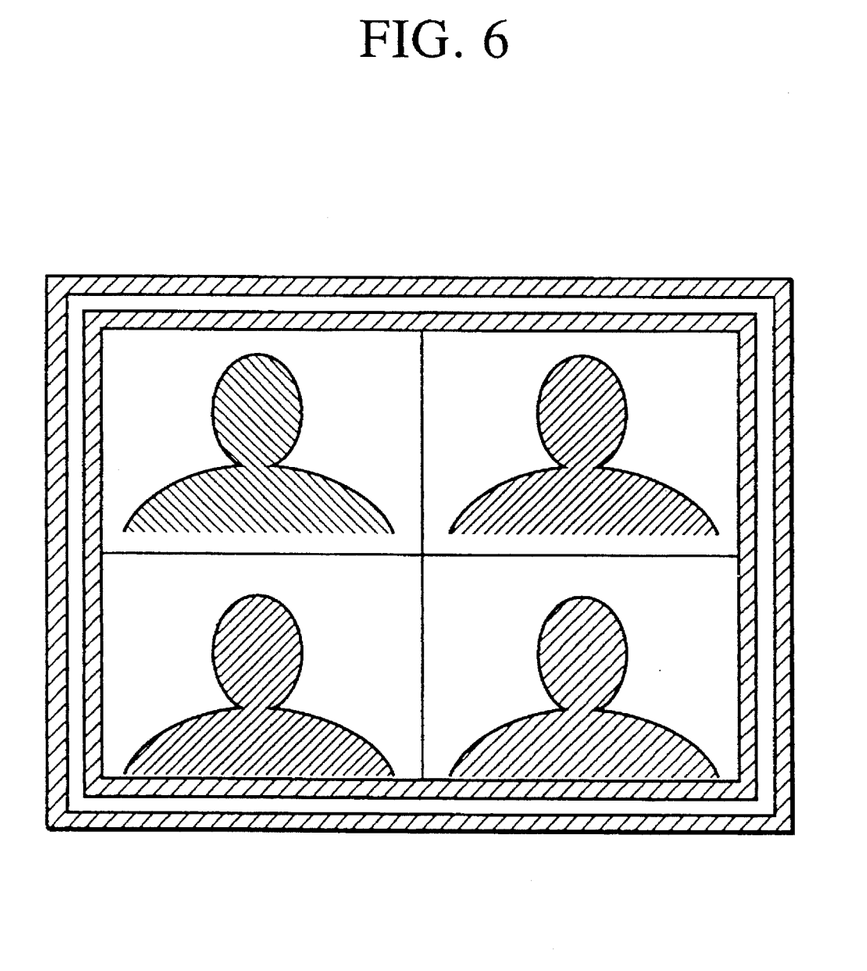
FIG. 6 is a drawing illustrating an example of a monitor display when the user's station is a speaking station in accordance with a second embodiment.
Figure 7:
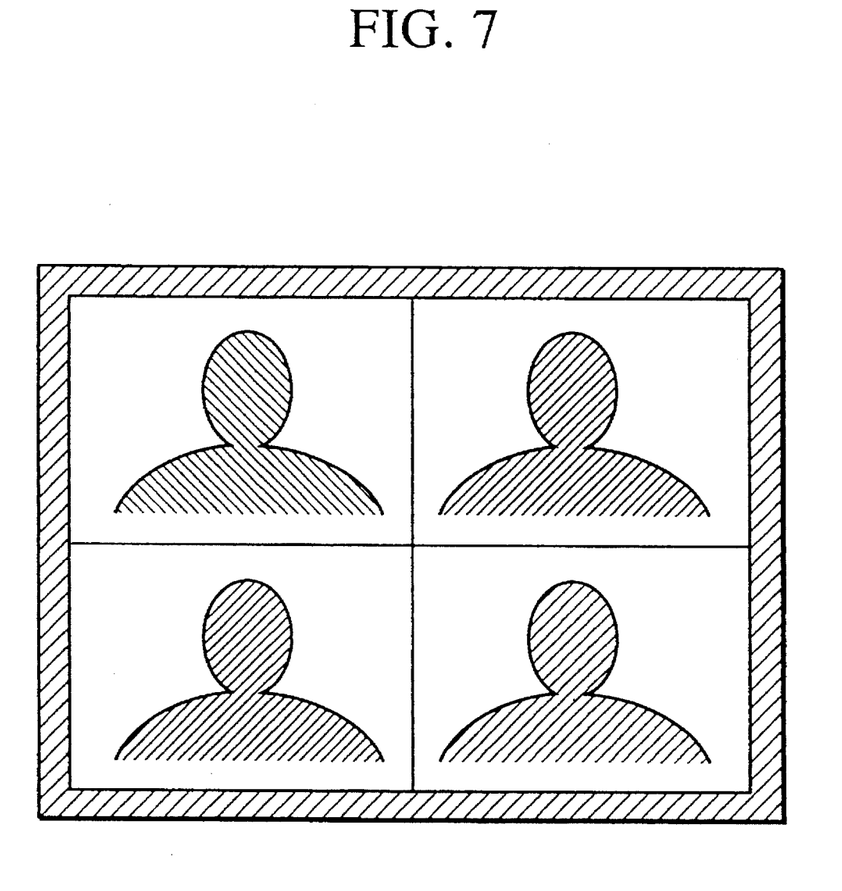
FIG. 7 is a drawing illustrating an example of a monitor display when the user's station is not a speaking station and receives an image request from another station in the second embodiment.

In this embodiment, when the user's own station is a speaking terminal (determined by a speaking request or detecting the speech level at each terminal), since the input image of the user's own station is invariably displayed on the other stations, the pattern for discriminating the presence or absence of an image request from another station is displayed on the monitor at the user's own station. However, when a voice is switched, there is the possibility that the pattern is still displayed as one of the multi-images of other terminals. The double frame shown in FIG. 6 is thus displayed for permitting decision whether or not a voice is obtained. When the user's own station is not a speaking station, and when an image request is received from another station, as shown in FIG. 7, a (single) frame image is displayed for discriminating the presence or absence of an image request for the user's own station, as in Embodiment 1.

Figure 8:
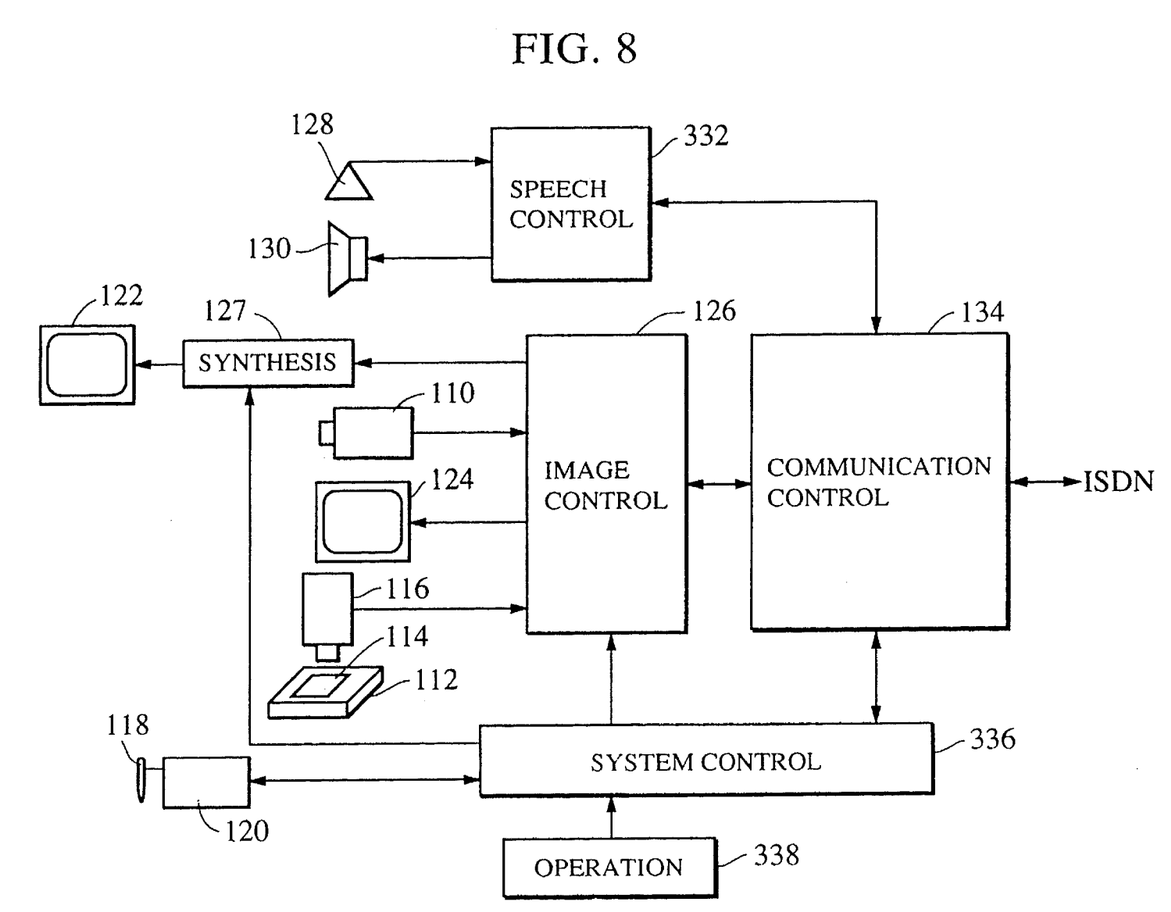
FIG. 8 is a block diagram illustrating the construction of a terminal apparatus in the second embodiment.

FIG. 8 is a block diagram illustrating the construction of a communication terminal apparatus in this embodiment. In FIG. 8, the circuits denoted by the same reference numerals as those shown in FIG. 1 have the same function, and are not described below. A speech control circuit 332 is the same as the above-described speech control circuit 132 except that a speech level detection section is added. The speech level detected by the speech level detection section is transmitted to the visual conference communication control device 404 shown in FIG. 9 through a communication control circuit 134. The visual conference communication control device 404 gives a voice to a station having a maximum speech level for a predetermined time by reference to the speech level obtained from each of the stations. When a voice is obtained by a speaking request, the input from the voice request button (not shown) provided on an operation section 338 is detected by a system control circuit 336, and then transmitted to the visual conference communication control device 404 through the communication control circuit 134. The visual conference communication control device 404 stores the voice request in a storage section (not shown), and gives voices to stations in order of output of the voice requests. The voice is switched to a voice for another station by re-input to the voice request button.

Figure 9:
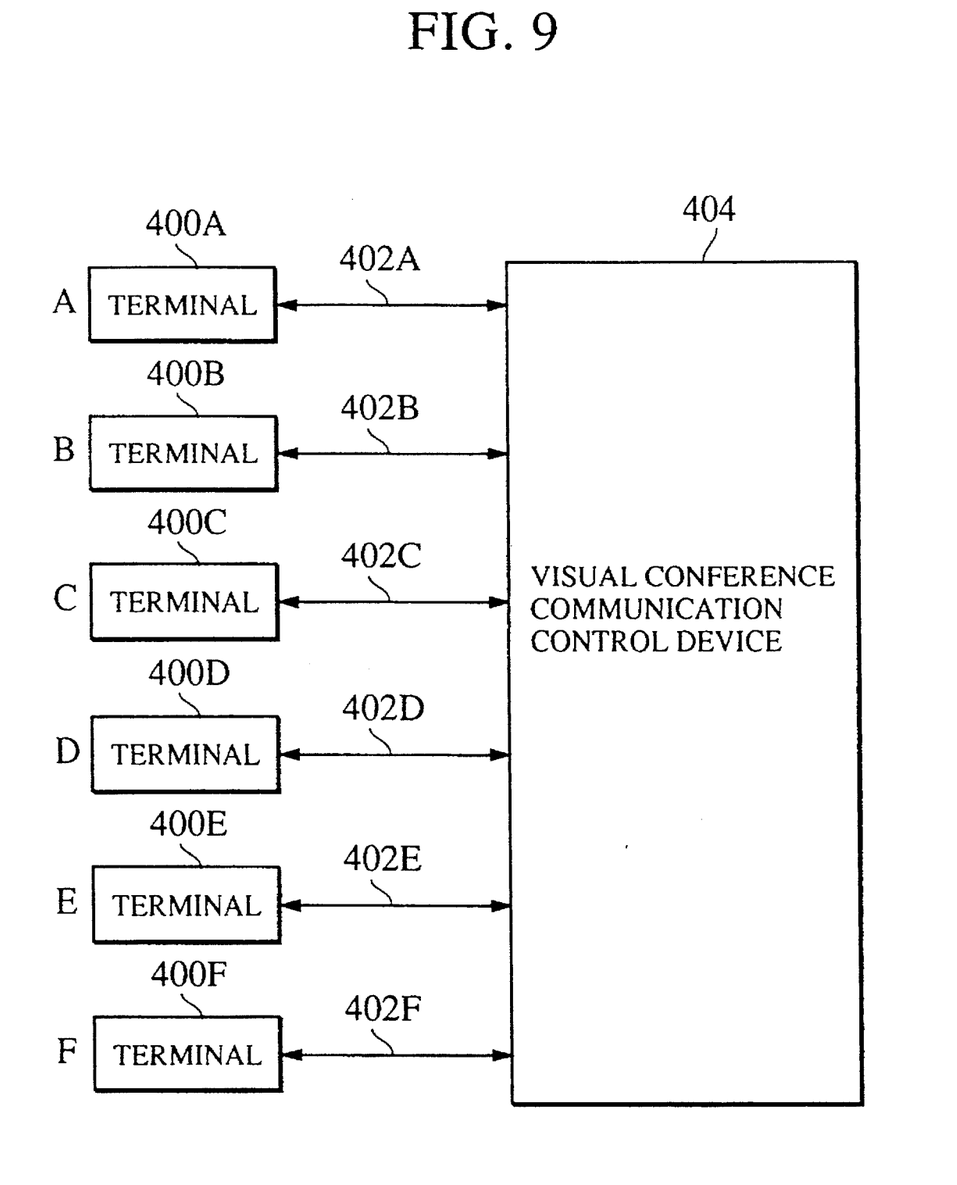
FIG. 9 is a block diagram illustrating the construction of a six-station visual conference.

Six stations 400A to 400F shown in FIG. 9 are connected to the visual conference communication control device 404 through digital lines 401A to 420F, respectively. Each of stations 400A to 400F has the construction shown in FIG. 8. The internal circuits of station terminals 400A to 400F are discriminated from each other by adding characters A to F to the reference numerals shown in FIG. 8.

The attendees at conference at stations A to F are photographed by cameras 110A to 110F, respectively. The photographic images are coded and transmitted to the visual conference communication control device 404. The visual conference communication control device 404 transmits a predetermined signal to the stations in accordance with an image request, release of an image request, a voice request and release of a voice request from each of the stations.

Figure 10:
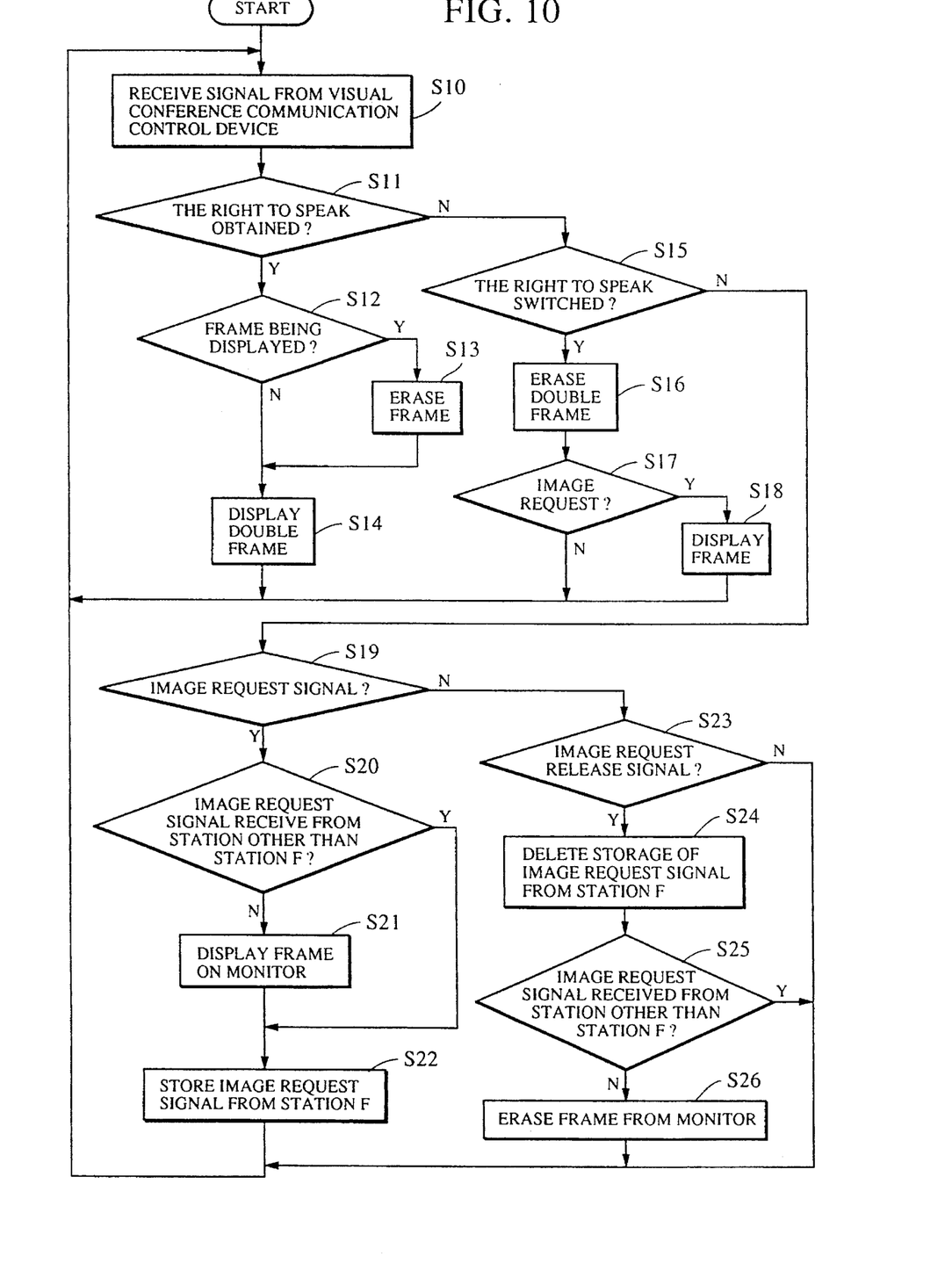
FIG. 10 is a flowchart illustrating the operation at the time of acquisition of a voice, switching of a voice, request for an image and release of an image request in the second embodiment.

The flowchart of the operation at the user's own station in accordance with an image request and release of an image request from another station (e.g., station F) will be described below with reference to FIG. 10.

When a control signal other than an image signal is received from the multi-point visual conference communication control device 404 (S10), the system control circuit 336 makes a decision as to whether or not the received signal is a voice acquisition signal (S11). If it is decided that the received signal is a voice acquisition signal, a decision is made as to whether or not a (single) frame has already been displayed by an image request from another station (S12). If the (single) frame is displayed, the frame is erased (S13), and a double frame is displayed in the periphery of the monitor 122 so as to make it possible to recognize that a voice is obtained (S14).

If the signal received from the multi-point visual conference communication control device 404 is a voice switch signal (S15), the double frame is erased (S16), and a decision is made, by reference to the storage section of the system control circuit 336, as to whether or not an image request for the user's own station is currently received from anther station (S17). If there is an image request from another station, the (single) frame is displayed (S18).

When the signal received from the multi-point visual conference communication control device 404 is an image request signal (S19), for example, if an image request is received from station F, as described above in Embodiment 1, a decision is made by the system control circuit as to whether or not an image request has already been received from a station other than station F (S20). If no image request has already been received from a station other than station F, the (single) frame is displayed on the monitor 122. The image request from station F is stored in the system control section 336. If an image request is received from a station other than station F, since the (single) frame has already been displayed, only an image request from station F is stored in the system control section 336 (S22).

If the signal received from the multi-point visual conference communication control device 404 is an image request release signal from, for example, station F (S23), the image request from station F which was previously stored in the system control circuit 336 is deleted (S24). The presence of an image request transmitted from another station is then checked. If no image request is received (S25), the (single) frame combined with the image transmitted from the image control circuit 126 is erased by a synthesis circuit 127 (S26).

In this embodiment, the double frame is displayed as a pattern for indicating that the user's own station is a speaking station, and the (single) frame is displayed for indicating that an image of the user'own station is displayed at another station by an image request. However, the display form is not limited to a frame, and any means can be used for informing that the user's own station is a speaking station, and that an image request for the user's own station is received from another station. When the user's own station is a speaking station, a mono input image of the user's own terminal may be displayed on its monitor so as to discriminating the image displayed at another terminal, or icon may be displayed. Alternatively, a lamp may be provided on the operation section so as to indicate that a voice is obtained, or a speaker may be used for information by a predetermined speech. In both Embodiments 1 and 2, as means for informing an image request, the name of the terminal which requests an image may be displayed, or a lamp may be provided on the operation section so as to display an image request. The speaker 130 may be used for informing an image request by a speech.

In an apparatus which can display multiple images, an image of a speaking station is invariably displayed on the monitors of all other stations. When the user's own station is a speaking station, since the voice acquisition of the user's own station is displayed, it is easily possible to recognize that the an image of the user's own terminal is displayed at the other terminals. When a voice is switched from the user's own station to another station, the image of the owner's own station is possibly displayed as one of the multiple images of the other stations. In this case, when an image request of the input image the user's own station is received from another station, means for recognizing the image request eliminates the need for the attendees to always be conscious of a camera.

Although the embodiment is described above in connection with a visual conference as an example, the present invention is not limited in its application to a visual conference, but can be applied to any communication system and communication terminals for communicating between a plurality of stations.

As is easily seen from the above description, the present invention permits the user to know, from observation of the screen at the user's own station, whether or not the image of the user's own station is currently displayed at another terminal. It is thus possible to easily ascertain whether or not the image input from the user's own station is displayed at another terminal, without the need for the user to be conscious of the camera at all times.

In addition, information for specifying the terminal at which the image of the user's own station is displayed is displayed on the screen at the user's own station so as to make it possible to ascertain the station to which the image of the user's own station is transmitted.

The present invention is not limited to the above embodiment, and various applications and modifications can be made within the scope of the claims.

What is claimed is:

1. A communication terminal apparatus for communicating communication data including at least image data to a plurality of other communication terminal apparatuses, said apparatus comprising:

image pickup means for picking up an image of an operator at said apparatus;

receiving means for receiving an image request signal from a communicating one of the plurality of other communication terminal apparatuses indicating that the communicating communication terminal apparatus is receiving the image of the operator; and informing means for informing the operator at said apparatus whether or not at least one of the plurality of other communication apparatuses is receiving the image of the operator in accordance with reception of the image request signal by said receiving means.

2. A communication terminal apparatus according to claim 1, wherein said informing means combines a predetermined image with an image to be displayed at said apparatus.

3. A communication terminal apparatus according to claim 2, wherein said predetermined image is a frame image for the image to be displayed at said apparatus.

4. A communication terminal apparatus according to claim 2, wherein each of the plurality of other communication terminal apparatuses has a respective mark specified therefor, and wherein said predetermined image includes the mark respectively specified for each of the plurality of other communication terminal apparatuses currently receiving the image of the operator.

5. A communication terminal apparatus according to claim 1, wherein said informing means informs the operator of reception of the image request signal by using a predetermined lamp.

6. A communication terminal apparatus according to claim 1, wherein said informing means informs the operator of reception of the image request signal by using a predetermined speech.

7. A communication terminal apparatus according to claim 1, wherein a number of the plurality of other communication terminal apparatuses is at least three.

8. A communication terminal apparatus according to claim 1, further comprising:

decision means for deciding which of the plurality of other communication terminal apparatuses has requested receipt of the image of the operator, based upon image request signals received by said receiving means.

9. A communication terminal apparatus according to claim 5, further comprising:

storage means for storing a decision result of said decision means;

confirmation means for confirming participation of any of the plurality of communication terminal apparatuses which has output a prior image request signal, previously stored in said storage means, when said receiving means receives an image request signal; and control means for controlling said informing means in accordance with a confirmation result of said confirmation means.

10. A communication terminal apparatus according to claim 1, further comprising:

second receiving means for receiving an image request release signal from any of the plurality of other communication terminal apparatuses.

11. A communication terminal apparatus according to claim 10, further comprising:

control means for making said informing means inoperative in response to said second receiving means receiving the image request release signal.

12. A communication terminal apparatus according to claim 10, further comprising:

decision means for deciding which of the plurality of other communication terminal apparatuses has transmitted the image request release signal received by said second receiving means.

13. A communication terminal apparatus according to claim 12, further comprising:

second confirmation means for confirming a participation of one of the plurality of communication terminal apparatuses which outputs an image request signal other than the communication terminal apparatus decided on by said second decision means; and control means for controlling said informing means in accordance with a confirmation result of said second confirmation means.

14. A communication terminal apparatus for communicating communication data including at least image data to a plurality of other communication terminal apparatuses, said apparatus comprising:

image pickup means for picking up an image of an operator at said apparatus;

receiving means for receiving a signal indicating that at least one of the plurality of other communication terminal apparatuses is displaying the image of the operator; and informing means for informing the operator at said apparatus whether or not at least one of the plurality of other communication terminal apparatuses is displaying the image of the operator in accordance with reception of the signal.

15. A communication method on a specific communication terminal apparatus for communicating data, including at least image data, to a plurality of other communication terminal apparatuses, said method comprising the steps of:

picking up an image of an operator at the specific apparatus;

receiving an image request signal from a communicating one of the plurality of other communication terminal apparatuses indicating that the communicating terminal apparatus is receiving the image of the operator; and informing the operator at the specific apparatus, by use of informing means at the specific apparatus, whether or not at least one of the plurality of other communication terminal apparatuses is receiving the image of the operator in accordance with reception of the image request signal in said receiving step.

16. A communication method according to claim 15, wherein said informing step is to combine a predetermined image with an image to be displayed at the specific apparatus.

17. A communication method according to claim 16, wherein the predetermined image is a frame image for the image to be displayed at the specific apparatus.

18. A communication method according to claim 16, wherein each of the plurality of other communication terminal apparatuses has a respective mark specified therefor, and wherein the predetermined image includes the mark respectively specified for each of the plurality of other communication terminal apparatuses currently receiving the image of the operator.

19. A communication method according to claim 15, wherein said informing step is to inform the operator of reception of the image request signal by using a predetermined lamp.

20. A communication method according to claim 15, wherein said informing step is to inform the operator of reception of the image request signal by using a predetermined speech.

21. The method according to claim 15, further comprising the step of:

deciding which of the plurality of other communication terminal apparatuses has requested receipt of the image of the operator, based upon image request signals received in said receiving step.

22. The method according to claim 21, further comprising the step of:

storing, in storing means, a result of said deciding step;

confirming participation of any of the plurality of communication terminal apparatuses which has output a prior image request signal, stored in a previous execution of said storing step, when said receiving step receives an image request signal.

23. A communication terminal apparatus for communicating communication data including at least image data to a plurality of other communication terminal apparatuses, said apparatus comprising:

input means for inputting an image at said apparatus;

receiving means for receiving an image request signal from a communicating one of the plurality of other communication terminal apparatuses indicating that the communicating communication terminal apparatus is receiving the input image; and informing means for informing an operator at said apparatus whether or not at least one of the plurality of other communication apparatuses is receiving the input image in accordance with reception of the image request signal by said receiving means.

24. A communication terminal apparatus for communicating communication data including at least image data to a plurality of other communication terminal apparatuses, said apparatus comprising:

image pickup means for picking up an image of an operator at said apparatus;

instruction means for inputting a display request instruction to request display of the image of the operator on respective monitors at the plurality of other communication terminal apparatuses;

transmission means for transmitting the image of the operator to the plurality of other communication apparatuses in response to the display request instruction;

detection means for detecting a request received from one of the plurality of communication terminal apparatuses after transmission of the image of the operator in accordance with the display request instruction, the request requesting receipt of an image picked up by said image pickup means; and informing means for informing the operator at said apparatus of a result of detection by said detection means.

25. A communication terminal apparatus according to claim 24, wherein said informing means combines a predetermined image with an image to be displayed at said apparatus.

26. A communication terminal apparatus according to claim 25, wherein said predetermined image is a frame image for the image to be displayed at said apparatus.

27. A communication terminal apparatus according to claim 24, wherein each of the plurality of other communication terminal apparatuses has a respective mark specified therefor, and wherein said informing means displays the mark respectively specified for the one of the plurality of other communication terminal apparatuses that sent the request.

28. A communication terminal apparatus according to claim 24, wherein said informing means informs the operator of reception of the request by using a predetermined lamp.

29. A communication terminal apparatus according to claim 24, wherein said informing means informs the operator of reception of the request by using a predetermined speech.

30. A communication terminal apparatus according to claim 24, wherein the communication data includes audio data, and wherein the display request instruction is a right-to-speak request instruction requesting a right to transmit audio data to the plurality of other communication terminal apparatuses.

31. A communication terminal apparatus for communicating communication data including at least image data to a plurality of other communication terminal apparatuses, said apparatus comprising:

image pickup means for picking up an image of an operator at said apparatus; and display means for simultaneously displaying all received images received from any of the plurality of other communication terminal apparatuses together with a display of an indication of whether or not one of the plurality of other communication terminal apparatuses is requesting receipt of the image of the operator.

32. A communication method on a specific communication terminal apparatus for communicating data, including at least image data, to a plurality of other communication terminal apparatuses, said method comprising the steps of:

inputting an image at the specific apparatus;

receiving an image request signal from a communicating one of the plurality of other communication terminal apparatuses indicating that the communicating communication terminal apparatus is receiving the input image; and informing an operator at the specific apparatus whether or not at least one of the plurality of other communication apparatuses is receiving the input image in accordance with reception of the image request signal by said receiving step.

33. A communication method on a specific communication terminal apparatus for communicating data, including at least image data, to a plurality of other communication terminal apparatuses, said method comprising the steps of:

picking up an image of an operator at the specific apparatus;

inputting a display request instruction to request display of the image of the operator on respective monitors of the plurality of other communication terminal apparatuses;

transmitting the image of the operator to the plurality of other communication apparatuses in response to the display request instruction;

detecting a request received from one of the plurality of communication terminal apparatuses after transmission of the image of the operator in accordance with the display request instruction, the request requesting receipt of an image picked up by said image pickup step; and informing the operator at the specific apparatus of a result of detection by said detection step.

34. A communication method according to claim 33, wherein said informing step is to combine a predetermined image with an image to be displayed at the specific apparatus.

35. A communication method according to claim 34, wherein the predetermined image is a frame image for the image to be displayed at the specific apparatus.

36. A communication method according to claim 33, wherein each of the plurality of other communication terminal apparatuses has a respective mark specified therefor, and wherein said informing step displays respectively specified for the one of the plurality of other communication terminal apparatuses that sent the request.

37. A communication method according to claim 33, wherein said informing step is to inform the operator of reception of the image request signal by using a predetermined lamp.

38. A communication method according to claim 33, wherein said informing step is to inform the operator of reception of the image request signal by using a predetermined speech.

39. The method according to claim 33, wherein the communication data includes audio data, and wherein the display request instruction is a right-to-speak request instruction requesting a right to transmit audio data to the plurality of other communication terminal apparatuses.

40. A communication method on a specific communication terminal apparatus for communicating data, including at least image data, to a plurality of other communication terminal apparatuses, said method comprising the steps of:

picking up an image of an operator at the specific apparatus; and simultaneously displaying all received images received from any of the plurality of other communication terminal apparatuses together with a display of an indication of whether or not one of the plurality of other communication terminal apparatuses is requesting receipt of the image of the operator.

* * * * *

UNITED STATES PATENT AND TRADEMARK OFFICE
CERTIFICATE OF CORRECTION

PATENT NO. : 5,577,107

DATED : November 19, 1996

INVENTOR(S) : Atsushi Imagaki

It is certified that error appears in the above-identified patent and that said Letters Patent is hereby corrected as shown below:

<u>COLUMN 2</u>
   Line 56, "speak" should read --speech--.

<u>COLUMN 6</u>
   Line 45, "user' own" should read --user's own--.
   Line 54, "discriminating" should read --discriminate--.

<u>COLUMN 9</u>
   Line 48, "step" should read --steps--.

<u>COLUMN 12</u>
   Line 8, "displays" should read --displays the mark--.

Signed and Sealed this

Twenty-second Day of April, 1997

*Attest:*

BRUCE LEHMAN

*Commissioner of Patents and Trademarks*

*Attesting Officer*